United States Patent [19]

Gou et al.

[11] Patent Number: 4,950,448
[45] Date of Patent: Aug. 21, 1990

[54] PASSIVE HEAT REMOVAL FROM CONTAINMENT

[75] Inventors: Perng-Fei Gou, Saratoga; Harold E. Townsend, Campbell, both of Calif.

[73] Assignee: General Electric Company, San Jose, Calif.

[21] Appl. No.: 350,189

[22] Filed: May 11, 1989

[51] Int. Cl.⁵ .......................................... G21C 15/18
[52] U.S. Cl. ................................... 376/283; 376/298
[58] Field of Search ............... 376/283, 298, 299, 282, 376/293

[56] References Cited

U.S. PATENT DOCUMENTS

| | | | |
|---|---|---|---|
| 4,050,983 | 9/1977 | Kleimola | 376/283 |
| 4,666,661 | 5/1987 | Fredell et al. | 376/299 |
| 4,889,682 | 12/1989 | Gou et al. | 376/283 |

FOREIGN PATENT DOCUMENTS

| | | | |
|---|---|---|---|
| 54-137596 | 10/1979 | Japan | 376/283 |
| 63-33697 | 2/1988 | Japan | 376/283 |
| 63-223593 | 9/1988 | Japan | 376/298 |

Primary Examiner—Daniel D. Wasil
Attorney, Agent, or Firm—Robert R. Schroeder

[57] ABSTRACT

A suppresion chamber in a nuclear reactor containment includes a heat exchanger disposed in a gas space above water in the suppression chamber. A gravity-driven pool contains a supply of make-up water that is gravity fed to the heat exchanger through a conventional level-maintaining valve such as a float valve. A top header in the heat exchanger includes a free surface area for permitting separation of steam from water, thereby permitting venting of vapor only, while retaining the liquid coolant in the heat exchanger. A downcomer tube permits return of excess water to a lower location for further use in the heat exchanger. The heat exchanger is normally sealed, whereby internal surfaces in the heat exchanger require only a small amount of low-volatility corrosion inhibitors to prevent corrosion on internal surfaces thereof. Locating the heat exchanger in the gas space in the suppression chamber reduces the amount of corrosion on its external surfaces. Condensate drips from the heat exchanger into the water below to disturb the water and thus enhance mixing and promote heat removal.

5 Claims, 1 Drawing Sheet

PASSIVE HEAT REMOVAL FROM CONTAINMENT

BACKGROUND OF THE INVENTION

The present invention relates to nuclear reactors and, more specifically, to techniques for cooling nuclear reactors, and their containments, in the event of one or more types of malfunctions.

During normal operation of a nuclear reactor, the nuclear fuel in a reactor vessel remains covered with water to generate steam. The nuclear fuel consists of fuel rods which develop substantial internal heat. After shutdown of the reactor, decay reactions continue to generate heat in the fuel rods for a lengthy period.

It is important to environmental safety to ensure that radioactive materials are not released during normal or abnormal operation. Such radioactive materials include, for example, steam generated in the reactor vessel and water that is condensed from such steam.

Abnormal operations include, for example, a loss-of-coolant accident which may occur due to a break in a component or piping such as, for example, a steam pipe, within the containment building. The three requirements in such a situation are (1) to refill the reactor pressure vessel with water to cover the fuel rods, (2) to dissipate the heat existing immediately following the break, and (3) to remove the decay heat over an extended period (days or weeks) following the break, such that structural integrity of the containment vessel is maintained.

In the prior art, the movement of cooling water to satisfy the three foregoing requirements is provided by high-pressure water pumps driven by electricity or other external power source. In the event of failure of the normal electrical grid supplying electric power to the plant, diesel generators are provided to take over the task of supplying power for driving the pumps. It is a fact, however, that there is a small but finite probability that diesel generators can fail to function at a critical time, or that human errors can incapacitate systems. Such failure following a serious loss of coolant accident such as, for example, a break in a steam pipe, can be considered a worst-case scenario.

In the prior art, a suppression pool is disposed in a wetwell within the containment building for a nuclear reactor. The wetwell pool includes a substantial volume of water in the suppression pool as well as a substantial volume of gas. During an accident, steam enters the suppression pool through vents from the drywell wherein the supply of water, initially at a temperature of 100 degrees F., or below, cools and condenses the steam. The design values of the containment permit an internal pressure of up to about 55 psig. This implies a maximum steam saturation temperature of about 248 degrees F. A suppression pool of a practical size is incapable of absorbing all of the heat initially contained in the steam vented to the drywell as well as the additional decay heat that must be dissipated over the ensuing several days, without exceeding the maximum temperature and pressure.

OBJECTS AND SUMMARY OF THE INVENTION

It is an object of the invention to provide a heat removal system for a nuclear reactor that overcomes the drawbacks of the prior art.

It is a further object of the invention to provide a heat removal system that is passive, and is capable of continuing to remove heat from a nuclear reactor for as long as necessary.

It is a still further object of the invention to provide a heat removal system including a heat exchanger disposed in a wetwell gas space above a suppression pool within the containment of a nuclear reactor. A vapor-separation device in the heat exchanger permits the discharge of steam produced in the heat exchanger. A gravity-driven water supply is metered through a float valve to add make-up water to the heat exchanger, thereby replacing water that has boiled off during heat removal. The size of the reservoir of the water supply establishes the duration of heat removal which may be accomplished.

Briefly stated, the present invention provides a suppression chamber in a nuclear reactor containment. The suppression chamber includes a heat exchanger disposed in a gas space above water in the suppression chamber. The gas space may contain air or nitrogen. A gravity-driven pool contains a supply of make-up water that is gravity fed to the heat exchanger through a conventional level-maintaining valve such as a float valve. A top header in the heat exchanger includes a free surface area for permitting separation of steam from water, thereby permitting venting of vapor only, while retaining the liquid coolant in the heat exchanger. A downcomer tube permits return of excess water to a lower location for further use in the heat exchanger. The heat exchanger is normally sealed, whereby internal surfaces in the heat exchanger require only a small amount of low-volatility corrosion inhibitors to prevent corrosion on internal surfaces thereof. Locating the heat exchanger in the gas space in the suppression chamber reduces the amount of corrosion on its external surfaces. Condensate drips from the heat exchanger into the water below to disturb the water and thus enhance mixing and promote heat removal.

According to an embodiment of the invention, there is provided, a heat removal system for removing heat from a containment of a nuclear reactor, comprising: a suppression chamber in the containment for the nuclear reactor means for venting steam from the nuclear reactor into the suppression chamber upon occurrence of an event requiring dissipation of heat from the nuclear reactor, the suppression chamber containing a quantity of water, the suppression chamber further containing a quantity of gas over the water, a heat exchanger in the suppression chamber, the heat exchanger including a plurality of heat-exchange elements, means for metering a supply a heat-exchange fluid to the heat exchanger to maintain a predetermined level of the heat-exchange fluid in the heat exchanger, means for permitting boiling of the heat-exchange fluid in the heat exchanger in response to the steam, means for separating a vapor in the heat exchanger from the heat-exchange fluid, and means for discharging the vapor from the heat exchanger, whereby heat is discharged from the suppression chamber, and the containment is maintained at a temperature and pressure below its design value.

According to a feature of the invention, there is provided a heat exchanger for removing heat from a suppression chamber of a nuclear reactor, comprising: a top header, a bottom header, the top header and the bottom header being disposed a predetermined distance apart, a plurality of heat-exchange tubes communicating between the top header and the bottom header, means for metering a supply of coolant to the heat exchanger, the means for metering including a float-controlled valve, thereby to maintain a predetermined level of the coolant in the heat exchanger, the predetermined level being at an intermediate height in the top header, thereby providing a free surface area in the top header, the free surface area being effective for permitting separation of a liquid and a vapor component of the coolant, a downcomer, the downcomer communicating between the top header and the bottom header for return of liquid from the top header to the bottom header, and means for encouraging a downward flow of liquid through the downcomer.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
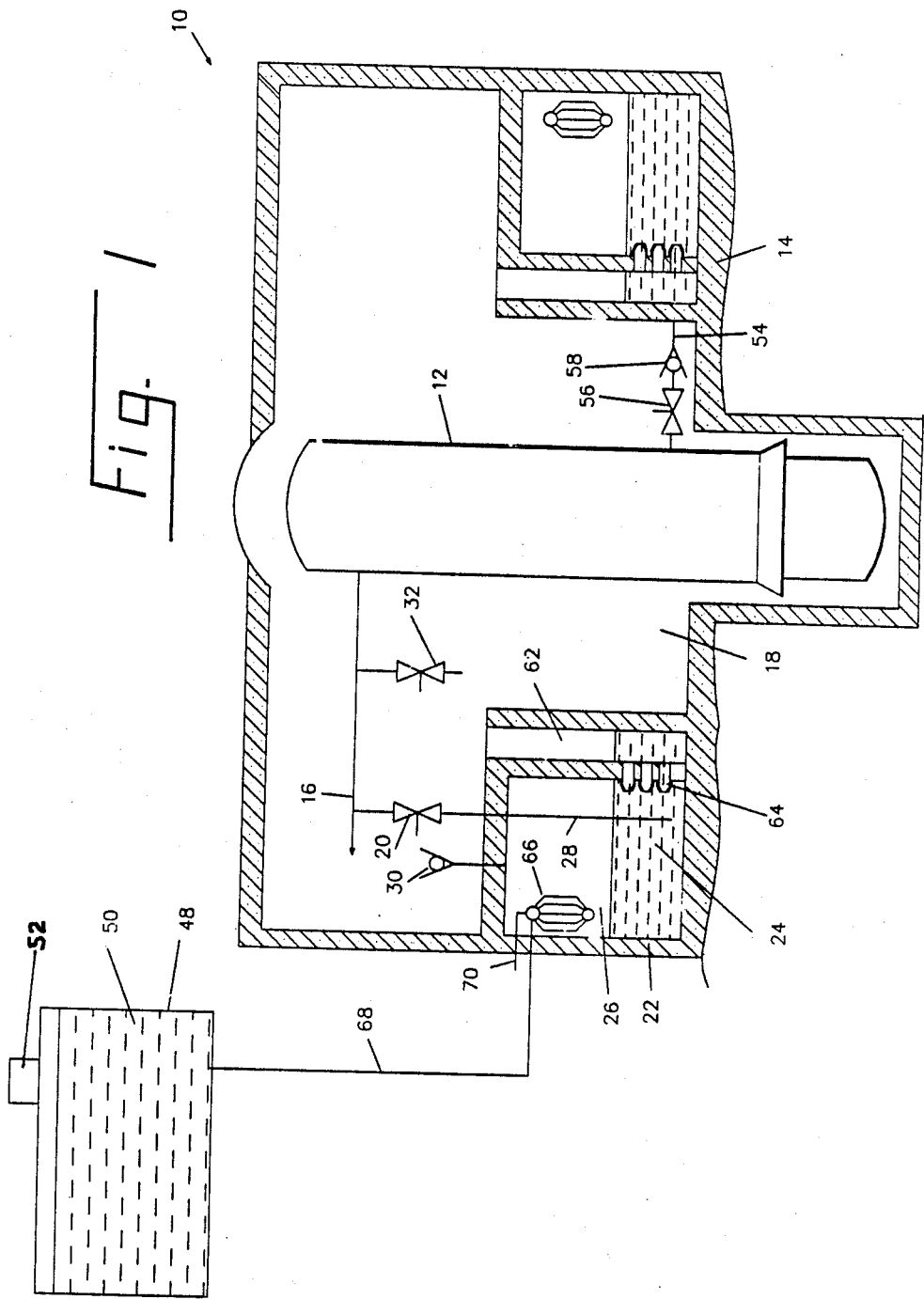
FIG. 1 is a simplified schematic diagram of a nuclear reactor system according to an embodiment of the invention.

Referring to FIG. 1, there is shown, generally at 10, relevant portions of a containment for a nuclear reactor system in accordance with the invention. A pressure vessel 12 is disposed within a containment building 14 (only part of which is shown). Containment building 14 is conventionally formed of reinforced concrete or structural steel having a strength sufficient to withstand expected values of pressure encountered therein.

As is conventional, pressure vessel 12 contains a quantity of water which is converted to steam, either directly or through an intermediate steam generator, by heat of nuclear fission produced in a plurality of fuel rods (not shown). Control rods (also not shown) are moved in and out between the fuel rods in pressure vessel 12 as necessary to control the production of heat and thus the amount of steam that is generated. Steam exits pressure vessel 12 (or an intermediate steam generator) on one or more main steam lines 16 to a steam turbine-generator (not shown).

A drywell 18 surrounds pressure vessel 12 for containment of liquid and/or steam in case of a rupture of nuclear components such as, for example, pressure vessel 12 or main steam line 16. A safety relief valve 20 is connected from main steam line 16 to a sealed suppression chamber 22 containing a quantity of water 24. A substantial gas space 26, containing air or nitrogen, remains free above the surface of water 24 to provide a compressible medium in suppression chamber 22, whereby steam can be admitted to suppression chamber 22 and additional water condensed from such steam can be accommodated. An outlet tube 28, connected to safety relief valve 20, passes into water 24, whereby the pressure in gas space 26 remains lower than the pressure in outlet tube 28 by the amount of hydraulic head produced by the submerged portion of outlet tube 28. A vacuum breaker valve 30 is a check valve permitting outward flow, particularly of non-condensable gasses, such as air or nitrogen, from suppression chamber 22 to drywell 18 for permitting the outward flow of steam and/or gas when the pressure in drywell 18 becomes less than the pressure in suppression chamber 22. A depressurization valve 32, connected to main steam line 16, opens to drywell 18.

An equalizing line 54 is connected between suppression chamber 22 and pressure vessel 12. A valve 56 controls the flow through equalizing line 54. A check valve 58 is normally closed to prevent the flow of water from pressure vessel 12 into suppression chamber 22. Equalizing line 54 returns condensed coolant from suppression chamber 22 to pressure vessel 12 and helps keep the reactor core covered in the event of a loss of coolant accident.

A plurality of vertical vent pipes 62 communicate between drywell 18 and a plurality of horizontal vents 64 leading into suppression chamber 2 below the top of water 24.

A heat exchanger 66 is disposed in gas space 26 above the surface of water 24 in suppression chamber 2. A coolant supply chamber 48, disposed external to containment building 14, contains a supply of water 50. Coolant supply pool 48 is preferably vented to the external environment through a stack 52. A make-up water supply line 68 is connected from coolant supply pool 48, through containment building 14, to heat exchanger 66. A steam vent line 70 is connected from heat exchanger 66, through containment building 14, to the external atmosphere.

Figure 2:
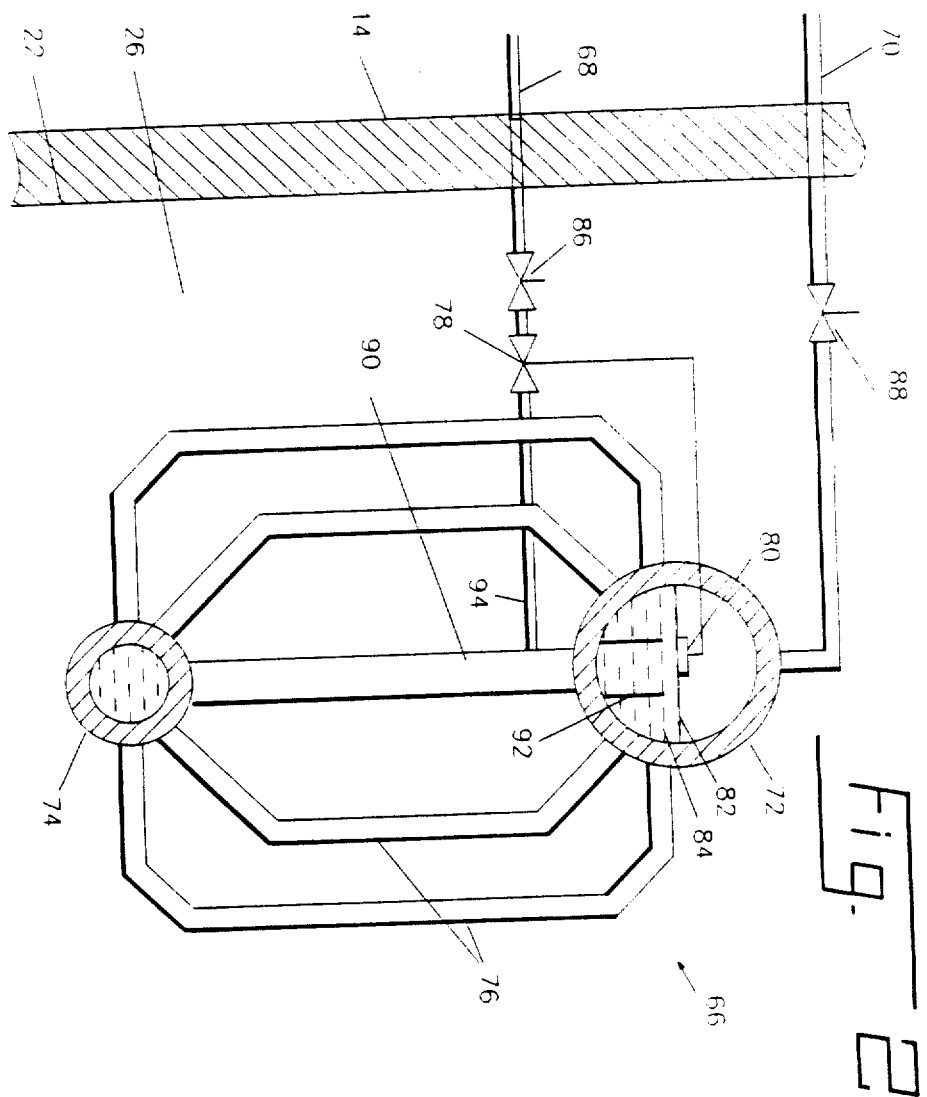
FIG. 2 is an enlarged cross section of the heat exchanger of FIG. 1, and including a schematic representation of its isolation and float valves.

Referring now also to FIG. 2, heat exchanger 66 includes a top header 72 spaced a substantial distance above a bottom header 74. A plurality of rows of heat-exchanger tubes 76 provide free communication between the interiors of top and bottom headers 72 and 74. In the illustrated embodiment, top and bottom headers 72 and 74 are joined by four rows of heat-exchanger tubes 76.

A float-controlled valve 78 in make-up water supply line 68 is controlled by a float 80 supported on a free surface area 82 of water 84 within top header 72. A normally-closed isolation valve 86 in make-up water supply line 68, and a similar isolation valve 88 in steam vent line 70 maintain containment integrity under normal conditions.

A downcomer tube 90 permits drainage of excess water 84 from top header 72 to bottom header 74. Heat-exchanger tubes 76 and 90 open into top and bottom headers 72 and 74. A U-shaped channel 92 is disposed longitudinally in top header 72 with the tops of its arms below the free surface area 82. An extension 94 of make-up water supply line 68 is connected to the top of downcomer tube 90.

In the event of a loss of coolant in pressure vessel 12, or a break in main steam line 16, safety relief valve 20 is opened to permit the flow of existing steam through outlet tube 28 and into water 24 in suppression chamber 22. Water 24 is initially a or below a temperature of about 100 degrees F. As the steam enters water 24 it condenses, thereby lowering the steam pressure in main steam line 16 and pressure vessel 12 and raising the temperature of water 24. While this continues, normal reactor controls are actuated to reduce the amount of heat generated in pressure vessel 12.

Water from an external source such as, for example, a gravity-driven pool, or powered pumps (neither of which is shown), floods pressure vessel 12 and drywell 18 to a level ensuring that all fuel rods are completely covered. Depressurization valve 32 is opened as a further means to vent main steam line 16 into drywell 18 to decrease the pressure in pressure vessel 12, such that water can flow in to cover the fuel rods.

The opening of depressurization valve 32 raises the pressure in drywell 18 to a value about equal to that in pressure vessel 12. As steam is condensed in suppression chamber 22, the pressure in suppression chamber 22 increases at a rate that is slower than the pressure increase in drywell 18. This permits additional steam to flow from drywell 18, through vent pipe 62 and horizontal vent 64 into water 24 in suppression chamber 22.

Isolation valves 86 and 88 are opened. Under usual pre-accident conditions, free surface area 82 is at about the level controlled by float-controlled valve 78 and float 80. Since the interior of heat exchanger 66 is vented to the atmosphere, the temperature at which water 84 in heat exchanger 66 begins producing steam is about 212 degrees F. In contrast, the temperature in containment building 14 can be allowed to increase to about 248 degrees F without exceeding the pressure limit of 55 PSIG. When the temperature in suppression chamber 22 exceeds the boiling point of water 84, steam begins forming in heat-exchanger tubes 76. This steam, mixed with unevaporated water, rises by convection into top header 72. Since free surface area 82 is well below the top of top header 72, ample space is provided for the steam to separate from the water, whereby substantially only steam reaches the top of top header 72 for exit through steam vent line 70 to the atmosphere. The excess water, carried into top header 72 by the rising steam, is permitted to flow downward through downcomer tube 90 to bottom header 74.

As water 84 is depleted by steam exiting through steam vent line 70, float-controlled valve 78 meters makeup water into downcomer tube 90 to maintain the water level in heat exchanger 66 at the operating level.

Since heat-exchanger tubes 76 and downcomer tube 90 are located in the same thermal environment in gas space 26, some means are desirably provided to ensure that water flows downward in downcomer tube 90 while permitting water and steam to flow upward in heat-exchanger tubes 76. Several techniques are available to accomplish this. Downcomer tube 90 may be made of a larger diameter than are heat-exchanger tubes 76, whereby reduced flow resistance exists therein. Alternatively, downcomer tube 90 may be made of an insulating material such as, for example, plastic, or may have a conventional insulating layer applied to its exterior or interior surface. Heat-exchanger tubes 76 are preferably made of metal and most preferably of carbon steel. A slightly greater thermal gradient through the insulating material of downcomer tube 90 than through heat-exchanger tubes 76 ensures a downward preferred flow direction in downcomer tube 90. Also, injecting the cooler make-up water from coolant supply pool 48 into the interior of U-shaped channel 92, or directly into downcomer tube 90 tends to make the water in the interior of downcomer tube 90 cooler than its saturation temperature and thereby suppress boiling of the water in downcomer tube 90. This encourages gravity circulation of water 84 down through downcomer tube 90 and up through heat-exchanger tubes 76.

As heat exchanger 66 extracts heat from gas space 26, the pressure in gas space 26 is reduced due to the condensation of steam on the surfaces of top header 72. Accordingly, additional steam is admitted from drywell 18 into suppression chamber 22. Thus heat continues to be removed from drywell 18 as long as a supply of water remains available in coolant supply pool 48 to maintain the water level in heat exchanger 66.

One skilled in the art will recognize that venting steam vent line 70 to the atmosphere is only one possible way of carrying off the heat from containment building 14. Alternatively, steam vent line 70 may be connected to a further heat exchanger (not shown), operating in a closed cycle to condense the steam produced in heat exchanger 66 and returning the condensate through make-up water supply line 68 and float-controlled valve 78 to maintain the required level of water 84 in heat exchanger 66.

The use of such a closed cycle offers a number of advantages. When water is used in heat exchanger 66, heat removal does not begin until the temperature in gas space 26 exceeds about 212 degrees F. Also, since the maximum temperature in containment building 14 is about 248 degrees F, a maximum temperature difference between the steam in gas space 26 and the boiling water in heat exchanger 66 is limited to 36 degrees F. A closed cycle permits the use of a coolant in heat exchanger 66 that has a boiling temperature lower than that of water. For example, a suitable fluorocarbon coolant may boil at a temperature as low as 110 degrees F. Using such a coolant thus permits heat removal to begin when the temperature in gas space 26 exceeds 110 degrees F. The maximum temperature difference between the gas space 26 and the coolant in heat exchanger 66 can be as much as 102 degrees F.

A further possibility offered by a closed system includes operating the interior of heat exchanger 66 at a pressure reduced below atmospheric pressure. Thus, with water as the heat-exchange coolant, the reduced pressure is capable of reducing the boiling temperature substantially below 212 degrees F. The resulting increased temperature differential between heat exchanger 66 and the steam in gas space 26 improves heat exchange.

A still further possibility derived from a closed system includes simplified testing for leak integrity of heat exchanger 66 and its associated piping. It is of note that, under normal conditions, heat exchanger 66 is sealed by closed isolation valve 86 and isolation valve 88. This permits the internal surfaces of heat exchanger 66 to be protected by a relatively small amount of conventional low-volatility corrosion inhibitors, without requiring corrosion inhibitor in the entire contents of coolant supply pool 48. This reduces the quality of make-up water that is required, whereby substantially any available source of make-up water may be used. In addition, the placement of heat exchanger 66 in gas space 26 reduces corrosion problems on the outer surfaces of heat exchanger 66, compared to those which would obtain if heat exchanger 66 were located within water 24. This may permit the use of lower-cost carbon steel for the elements of heat exchanger 66, rather than the much more expensive stainless steel which might otherwise be required.

We have discovered that, while heat is being removed from gas space 26, liquid condenses on the relatively cooler outer surface of heat exchanger 66. This liquid, falling into water 24, disturbs the surface of water 24, thereby promoting improved mixing in water 24.

The foregoing description has used a simplified apparatus in one configuration for convenience of description. For example, a commercial nuclear reactor system may employ two or more main steam lines 16 with appropriate valves and controls.

A further embodiment, which is considered to fall within the scope of the invention, includes a nuclear reactor that uses nuclear heat to heat water and produce steam in a second loop via a steam generator. Such an embodiment of the invention may exist without the specific containment configuration shown and described in the foregoing.

The invention described herein is applicable to all types of light water cooled nuclear facilities.

The foregoing description has described a single heat exchanger 66 in a suppression chamber 22. A plurality of heat-exchanger tubes 76 are connected in planes between top header 72 and bottom header 74. Each set of top header 72, bottom header 74, and its associated heat-exchanger tubes 76 is denoted as a module. In one embodiment of the invention, heat-exchanger tubes 76 are arranged in 37 planes of four tubes each. Each tube is made of 2.5-inch diameter carbon steel tube. The vertical run of heat-exchanger tubes 76 is about 15 feet. In a practical embodiment, suppression chamber 22 is generally annular. A plurality of modules are disposed about suppression chamber 22. Each module is served by make-up water from its own coolant supply pool 48, whereby full redundancy is attained. In the mentioned embodiment, a total of five modules is provided. The number of modules required depends on the amount of heat which must be discharged. In other installations, one skilled in the art would be fully enabled to select the number of heat-exchanger tubes 76 per heat exchanger 66 and the number of heat exchangers 66 required to dissipate the required amount of heat for such other installations. The criteria for selecting the apparatus includes the maximum temperature and pressure that a particular containment building 14 can withstand.

For an open system, the amount of time during which the total number of heat exchangers 66 can dissipate the initial and decay heat of pressure vessel 12 depends on the amount of coolant in all of the coolant supply pools 48. It may be assumed that the decay heat is almost completely spent after several days. Thus, if an initial supply of water 50 in the plurality of coolant supply pools 48 is sufficient for dissipating the initial and decay heat for, for example, three days, plenty of time is available for making decisions regarding replenishment of water 50 in good time before water 50 is depleted. Alternatively, coolant supply pools 48 can be made large enough to permit unlimited time. For example, since the quality of water 50 is not critical, coolant supply pool 48 may be fed by untreated water from an available stream of spring, whereby there is no possibility of depletion of water 50.

In the illustrated and described embodiment, heat-exchanger tubes 76 are plain metal tubes. One skilled in the art will recognize that heat exchange between gas space 26 and the interiors of heat-exchanger tubes 76 can be enhanced by the addition of heat-exchange enhancers on the outer and/or inner surfaces of heat-exchanger tubes 76. For example, any type of fin (not shown) may be added to the outer surfaces of heat-exchanger tubes 76 to increase the surface area in contact with gas space 26. Such heat-exchange enhancers may reduce the size or number of heat exchangers 66 required. Relationships between the contact area and the number and/or size of modules will be immediately apparent to one skilled in the art and do not require detailed enumeration herein. Also, although there are cost and other advantages to using cylindrical tubes for heat-exchanger tubes 76, the invention should not be seen as limited to such a structure. For example, it is within the contemplation of the inventors that a plurality of planar structures, having suitable flow channels therein, may be employed instead of heat-exchanger tubes 76, without departing from the spirit and scope of the invention. A suitable planar structure may be similar to that seen in common refrigeration units wherein two sheets of metal, commonly aluminum, are bonded together in a pattern. The bonding pattern produces flow channels for the flow of coolant therebetween.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A heat removal system for removing heat from a containment of a nuclear reactor, comprising:
    a sealed suppression chamber in said containment;
    means for venting steam from said nuclear reactor into said suppression chamber upon occurrence of an event requiring dissipation of heat from said nuclear reactor;
    said suppression chamber containing a quantity of water;
    said suppression chamber having a gas-containing space above said water;
    a heat exchanger disposed within the gas-containing space of said suppression chamber;
    said heat exchanger including an enclosed structure for holding a heat-exchange fluid;
    means for metering a supply of heat-exchange fluid to said heat exchanger to maintain a predetermined level thereof in said enclosed structure;
    said heat-exchange fluid boiling in said heat exchanger in consequence of heat transfer thereto from steam present in said suppression chamber;
    means for separating a heat-exchange fluid vapor in said heat exchanger from said heat-exchange fluid; and
    means for discharging said vapor immediately following its separation from heat-exchange fluid directly from said heat exchanger to a location exterior of said containment, whereby heat is discharged from said suppression chamber, and said containment is maintained at a temperature and pressure below its design value.

2. Apparatus according to claim 1, wherein:
    said heat-exchange fluid is water; and
    said means for discharging said vapor includes a vent line communicating the heat exchanger enclosure structure to the atmosphere outside said containment.

3. Apparatus according to claim 1, wherein said means for metering a supply includes:
    a coolant supply pool external to said containment;
    a coolant supply line penetrating said containment and communicating said coolant supply pool and said heat exchanger; and
    a float-controlled valve;
    said float-controlled valve including means operable responsive to a variation of coolant level in said heat exchanger for metering coolant from said supply pool into said heat exchanger.

4. Apparatus according to claim 1, wherein said enclosed structure includes:
a free surface area,
said free surface are separating a volume containing predominantly liquid coolant from a volume containing predominantly vapor of said coolant, whereby separating said vapor from said coolant is enabled.

5. Apparatus according to claim 1, wherein:
said heat exchanger includes a plurality of heat-exchange modules in said suppression chamber; and
said metering means includes independent means for metering heat-exchange fluid to each of said plurality of heat-exchange modules.

* * * * *

UNITED STATES PATENT AND TRADEMARK OFFICE
CERTIFICATE OF CORRECTION

Page 1 of 2

PATENT NO. : 4,950,448

DATED : August 21, 1990

INVENTOR(S) : Perng-Fei Gou et al

It is certified that error appears in the above-identified patent and that said Letters Patent is hereby corrected as shown below:

The sheet of drawing consisting of Fig. 2, should be added as shown on the attached sheet.

Signed and Sealed this

Third Day of December, 1991

Attest:

HARRY F. MANBECK, JR.

*Attesting Officer*      *Commissioner of Patents and Trademarks*